United States Patent
Sakuma

(10) Patent No.: US 7,464,325 B2
(45) Date of Patent: Dec. 9, 2008

(54) INFORMATION TERMINAL DEVICE

(75) Inventor: Takeshi Sakuma, Ome (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 0 days.

(21) Appl. No.: 11/602,322

(22) Filed: Nov. 21, 2006

(65) Prior Publication Data
US 2007/0079196 A1    Apr. 5, 2007

Related U.S. Application Data

(62) Division of application No. 10/305,088, filed on Nov. 27, 2002, now Pat. No. 7,146,559.

(30) Foreign Application Priority Data

Nov. 30, 2001 (JP) ............................. 2001-367481
Nov. 30, 2001 (JP) ............................. 2001-367947

(51) Int. Cl.
H04L 7/00 (2006.01)

(52) U.S. Cl. ....................................... 714/814; 714/749

(58) Field of Classification Search ................. 714/748, 714/749, 750, 814; 455/408; 370/235, 516
See application file for complete search history.

(56) References Cited

U.S. PATENT DOCUMENTS 6,477,649 B2    11/2002    Kambayashi et al.
6,539,047 B1    3/2003    Moon
6,570,945 B1    5/2003    Ono et al.
6,587,985 B1    7/2003    Fukushima et al.
6,747,920 B2    6/2004    Denda et al.
6,747,998 B1    6/2004    Enari
6,891,799 B1    5/2005    Hagai et al.
6,978,139 B2 *    12/2005    Adatrao et al. ............... 455/442
7,068,707 B2 *    6/2006    Bender et al. ............... 375/148
7,092,911 B2    8/2006    Yokota et al.
2002/0160749 A1    10/2002    Nishikawa
2003/0120604 A1    6/2003    Yokota et al.

FOREIGN PATENT DOCUMENTS

| JP | 07287512 | 10/1995 |
| JP | 10512074 | 11/1998 |
| JP | 11085500 | 3/1999 |
| JP | 11167768 | 6/1999 |

(Continued)

OTHER PUBLICATIONS

Translation of Office Action for Japanese Patent Application No. 2001-367947, mailed Jun. 14, 2005.

(Continued)

Primary Examiner—Guy J Lamarre
Assistant Examiner—Fritz Alphonse
(74) Attorney, Agent, or Firm—Banner & Witcoff, Ltd

(57) ABSTRACT

Detection as to the reproduction expiration time of contents is executed, using the measured time of a system clock managed based on system time data from a base station BS. If the reproduction expiration time of the contents is not exceeded, the contents can be reproduced, whereas if it is exceeded, the contents are not reproduced, and a message "Expired" is generated and displayed on a display.

12 Claims, 10 Drawing Sheets

FOREIGN PATENT DOCUMENTS

| | | |
|---|---|---|
| JP | 1126792 | 2/2000 |
| JP | 200047867 | 2/2000 |
| JP | 2001143040 | 5/2001 |
| JP | 2001202493 | 7/2001 |
| WO | 9627155 | 9/1996 |

OTHER PUBLICATIONS

Translation of Office Action for Japanese Patent Application No. 2001-367481, mailed Jun. 14, 2005.

Front Page Only of WO 96/27155, dated Sep. 6, 1996.

Translation of Office Action for Japanese Patent Application No. 2001-367947, mailed Mar. 29, 2005.

Translation of Office Action for Japanese Patent Application No. 2001-367481, mailed Mar. 29, 2005.

Translation of Office Action for Japanese Patent Application No. 2001-367947, mailed Sep. 13, 2005.

Translation of Office Action for Japanese Patent Application No. 2001-367481, mailed Sep. 13, 2005.

\* cited by examiner

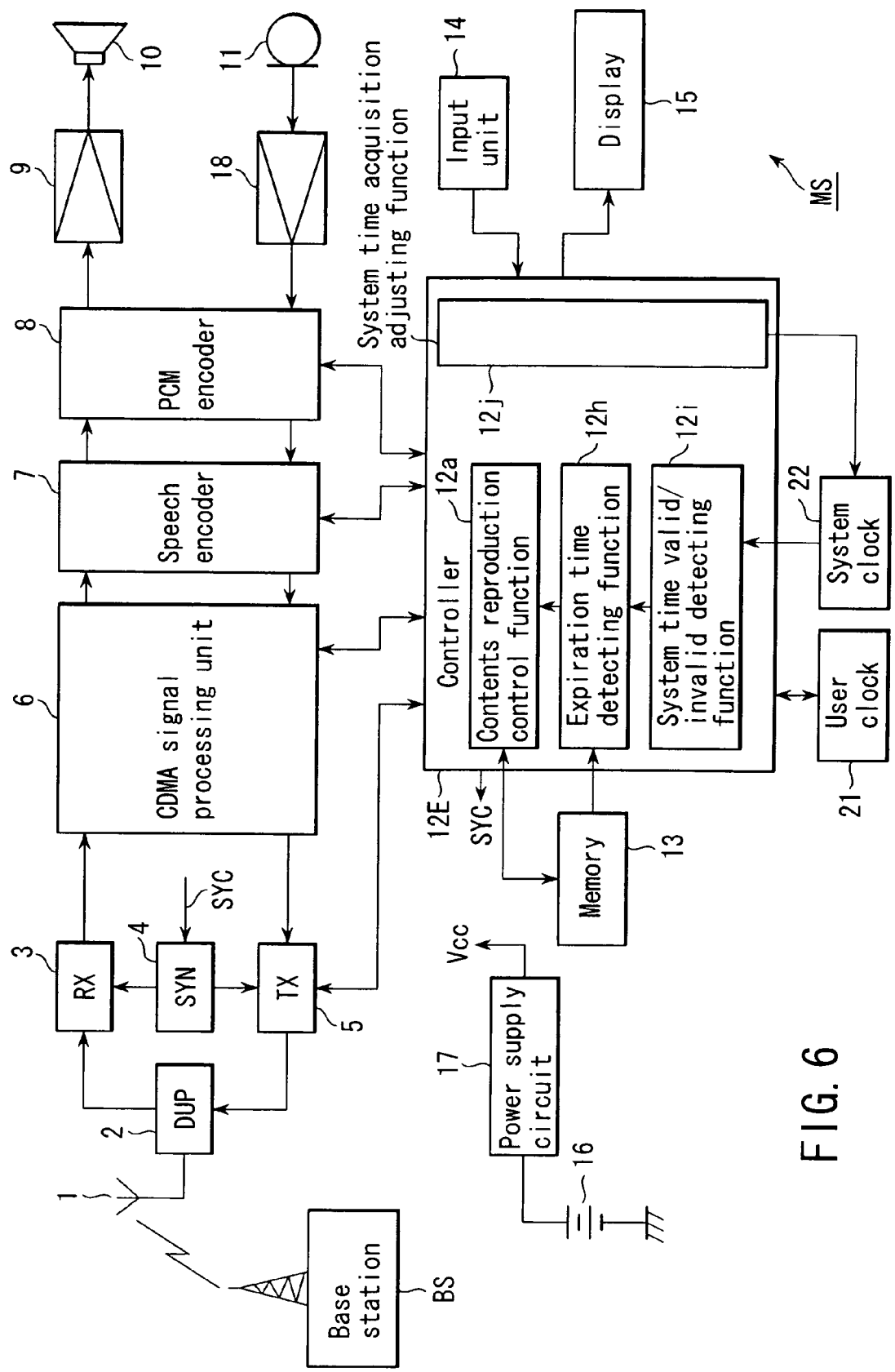
F I G. 6

INFORMATION TERMINAL DEVICE

CROSS-REFERENCE TO RELATED APPLICATIONS

This application is based upon and claims the benefit of priority from the prior Japanese Patent Applications No. 2001-367481, filed Nov. 30, 2001; and No. 2001-367947, filed Nov. 30, 2001, the entire contents of both of which are incorporated herein by reference. This application is also a divisional of U.S. application Ser. No. 10/305,088, filed Nov. 27, 2002.

BACKGROUND OF THE INVENTION

1. Field of the Invention

The present invention relates to an information terminal device such as a personal computer, mobile phone, etc., and more particularly to a device equipped with a function for reproducing contents on or before an expiration time.

2. Description of the Related Art

Many recent information terminal devices, such as notebook type personal computers, mobile phones, etc., are equipped with a function for reproducing contents received via a communication network or recorded on a recording medium. These devices are very convenient since they enable users to enjoy contents, such as favorite music or images, anywhere.

In the meantime, contents, in which a reproduction valid term (for example, the contents are reproducible only within three days of their downloaded date) or reproduction expiration time (for example, the contents are reproducible on or before, for example, 30 Nov. 2001) is set for the protection of copyright, are now increasing. When such contents are reproduced, in conventional mobile communication terminals, the reproduction valid term or reproduction expiration time set for the contents is compared with the present time of an internal clock. If the present time is within the reproduction valid term or on or before the reproduction expiration time, the contents are reproduced.

However, in general, internal clocks employed in information terminal devices have errors caused by reference oscillators. Accordingly, when the errors are large, the-reproduction term of contents cannot be accurately managed. Further, the time of the internal clocks of such devices can be manually adjusted. Therefore, if a user intentionally changes the time of the internal clock, contents remain reproducible even after their expiration time, which makes it impossible to prevent unauthorized use of the contents.

Further, in general mobile communication systems, if an information terminal device is positioned outside the service area of a base station, or if it is within a building or under the ground even inside the service area, it cannot receive system time data transmitted from the base station. Also, while the information terminal device is being transported at a high speed, it cannot sometimes receive the system time data from the base station due to, for example, the fading phenomenon.

BRIEF SUMMARY OF THE INVENTION

The present invention has been developed in light of the above circumstances, and aims to provide an information communication terminal capable of accurately managing the reproduction expiration time of contents.

According to a first aspect of the invention, there is provided an information terminal device having a function for reproducing contents for which a reproduction expiration time is preset, comprising: a first clock whose measured time can be adjusted by a user; a receiver configured to receive standard time data transmitted from a transmitter station; a time adjuster configured to adjust a value corresponding to the measured time of the first clock based on the standard time data received by the receiver; a comparison unit configured to compare the reproduction expiration time of the contents with the value adjusted by the time adjuster; a detection unit configured to detect whether or not the value adjusted exceeds the reproduction expiration time of the contents; and a reproduction controller configured to reproduce the contents if the detection unit detects that the value adjusted does not exceed the reproduction expiration time of the contents.

According to a second aspect of the invention, there is provided an information terminal device having a function for reproducing contents for which a reproduction expiration time is preset, comprising: a first clock whose measured time can be adjusted by a user; a second clock; a receiver configured to receive standard time data transmitted from a transmitter station; a time adjuster configured to adjust the measured time of the second clock based on the standard time data received by the receiver; a comparison unit configured to compare the reproduction expiration time of the contents with the time adjusted of the second clock; a detection unit configured to detect whether or not the time adjusted of the second clock exceeds the reproduction expiration time of the contents; and a reproduction controller configured to reproduce the contents if the detection unit detects that the time adjusted of the second clock does not exceed the reproduction expiration time of the contents.

According to a third aspect of the invention, there is provided an information terminal device having a function for reproducing contents for which a reproduction expiration time is preset, comprising: a time acquisition unit configured to acquire a standard time from an external device; an execution unit configured to execute time measurement based on the standard time acquired; a first detection unit configured to detect whether a measured time of the execution unit is valid or invalid; a second detection unit configured to detect whether or not the measured time of the execution unit exceeds the reproduction expiration time of the contents; and a reproduction controller configured to reproduce the contents if the first detection unit detects that the measured time of the execution unit is valid and if the second detection unit detects that the measured time of the execution unit does not exceed the reproduction expiration time of the contents.

According to a fourth aspect of the invention, there is provided an information terminal device having a function for reproducing contents for which a reproduction valid term is preset, comprising: a time acquisition unit configured to acquire a standard time from an external device; an execution unit configured to execute time measurement based on the standard time acquired; a first detection unit configured to detect whether a measured time of the execution unit is valid or invalid; and an expiration time setting unit configured to set a reproduction expiration time for the contents based on the measured time of the execution unit and the reproduction valid term of the contents, if the first detection unit detects that the measured time of the execution unit is valid, the expiration time setting unit setting no reproduction expiration time if the first detection unit detects that the measured time of the execution unit is invalid.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a block diagram illustrating the configuration of a mobile communication terminal as an-information terminal device according to a fifth embodiment of the invention;

DETAILED DESCRIPTION OF THE INVENTION

First Embodiment

A CDMA mobile communication terminal according to a first embodiment of the invention employs a system clock for receiving system time data (usually including date information) transmitted from a base station, and executing time measurement based on the received data. When the terminal reproduces contents, it detects, if a reproduction expiration time is set for the contents, whether or not the contents are reproducible, by comparing the reproduction expiration time with the present time of the system clock. If the contents are detected reproducible, they are reproduced.

Figure 1:
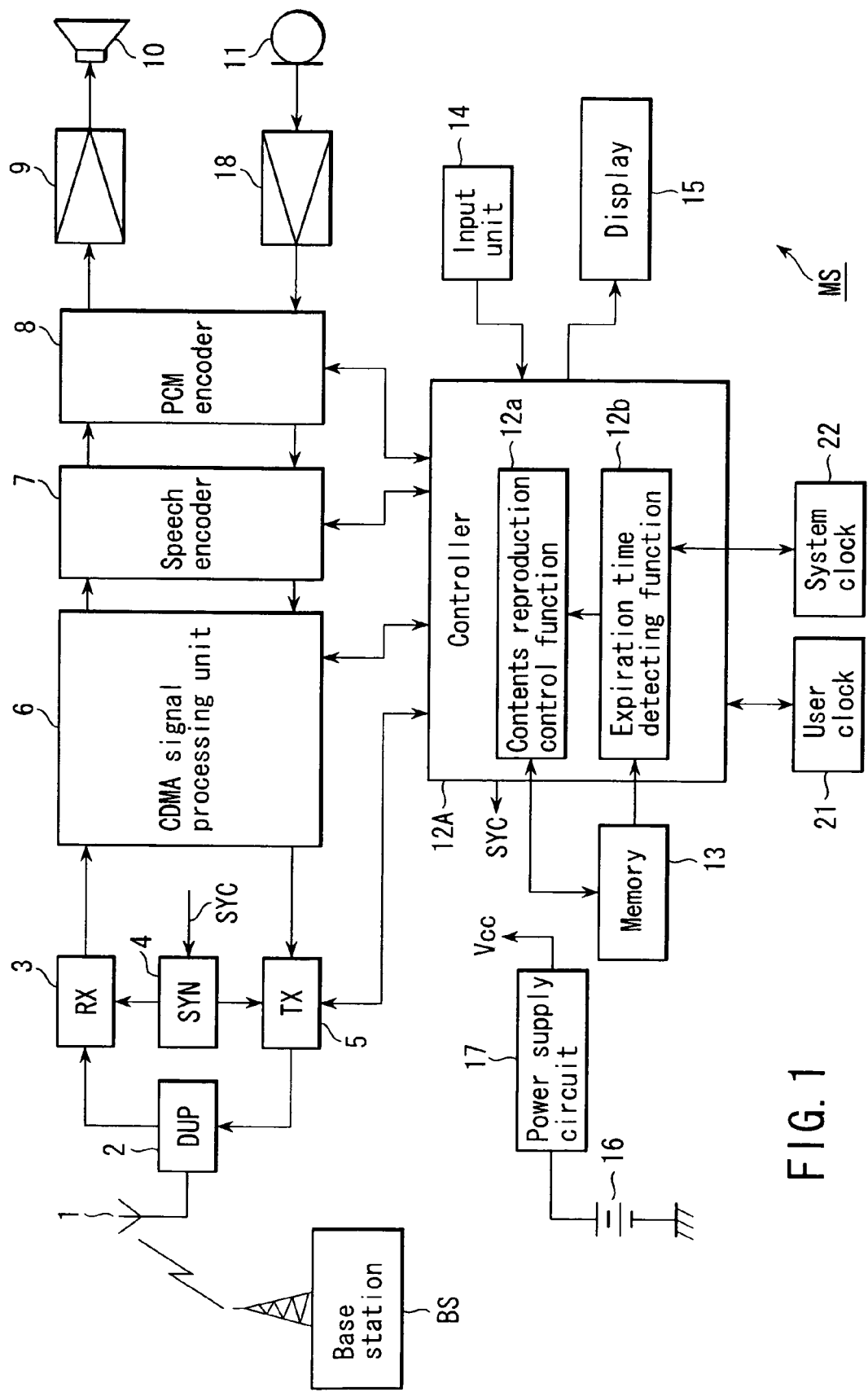
FIG. 1 is a block diagram illustrating the configuration of a mobile communication terminal as an information terminal device according to a first embodiment of the invention.

FIG. 1 is a block diagram illustrating the configuration of the mobile communication terminal as the information terminal device according to the first embodiment of the invention. This mobile communication terminal MS employs the CDMA (Code Division Multiple Access) system as the radio communication method between the terminal and a base station.

A radio frequency signal transmitted from a base station BS is received by an antenna 1 and input to a receiving circuit (RX) 3 via an antenna duplexer (DUP) 2. The receiving circuit 3 mixes the radio frequency signal with a receiving local oscillation signal output from a frequency synthesizer (SYN) 4, with the result that the radio frequency signal is frequency-converted into an intermediate frequency signal or baseband signal. The frequency of the receiving local oscillation signal generated from the frequency synthesizer 4 is designated by a control signal SYC from a controller 12A.

The receiving intermediate frequency signal or receiving baseband signal is input to a CDMA signal processing unit 6. The CDMA signal processing unit 6 executes orthogonal demodulation processing, and despreading processing using a spreading code assigned to the receiving channel, on the receiving intermediate frequency signal or receiving baseband signal. As a result, demodulated data of a predetected format corresponding to the data rate is obtained. The demodulated data is input to a speech encoder 7. The control data contained in the demodulated data, which indicates the data rate, is input, as receiving data rate, to the controller 12A.

The speech encoder 7 executes decompression processing corresponding to the receiving data rate reported from the controller 12A, on the demodulated data output from the CDMA signal processing unit 6, and then executes decoding processing using, for example, Viterbi decoding, and error correction/decoding processing. As a result, a received digital data of a baseband is reproduced.

A PCM encoder 8 executes different signal processes between different types of communication output from the controller 12A (speech or data communication). Specifically, when speech communication is executed, the PCM encoder 8 PCM-encodes the receiving digital data output from speech encoder 7 and outputs an analog receiving signal. This analog receiving signal is amplified by a receiving signal amplifier 9 and output as a speech from a loudspeaker 10. During image or data communication, the PCM encoder 8 sends the receiving digital data, output from the speech encoder 7, to the controller 12A. The controller 12A outputs the receiving digital data in a memory 13 and displays it on a display 15.

When necessary, the receiving digital data can be transferred, via an external interface (not shown), to an external information terminal, such as a portable data terminal (PDA: Personal Digital Assistant), a notebook personal computer, etc., which are not shown.

On the other hand, the input voice of a loud-speaker during speech communication is input as an analog speech signal via a microphone 11, and is amplified to an appropriate level by a speech amplifier 18. After that, the amplified signal is input to the PCM encoder 8. The PCM encoder 8 executes PCM encoding on the input analog speech signal. The resultant transmission data is supplied to the speech encoder 7. Further, the data output from the external information terminal is input to the controller 12A via an external interface (not shown), then input to the speech encoder 7 via the PCM encoder 8 from the controller 12A.

During speech communication, the speech encoder 7 detects the energy of input voice based on the transmission audio data output from the PCM encoder 8, and detects the data rate from the detection result. After that, the transmission data is compressed into a burst signal of a format corresponding to the detected data rate, then subjected to error correction coding, and output to the CDMA signal processing unit 6. On the other hand, during data communication, the transmission data output from the PCM encoder 8 is compressed into a burst signal of a format corresponding to a preset data rate. After that, the compressed transmission data is subjected to error correction coding and output to the CDMA signal processing unit 6. The data rate during speech and data communication is reported, as a transmission data rate, to the controller 12A.

The CDMA signal processing unit 6 executes spread processing on the burst signal compressed by the speech encoder 7, using a spreading code assigned to the transmission channel used. Thereafter, it executes orthogonal modulation on the transmission signal obtained by spread coding, and outputs the resultant orthogonal modulation signal to a transmission circuit (TX) 5.

The transmission circuit 5 synthesizes, into a radio frequency signal, the orthogonal modulation signal output from the CDMA signal processing unit 6, and a transmission local oscillation signal output from the frequency synthesizer 4. Thereafter, the transmission circuit 5 amplifies the higher frequency components of only the effective portion of the radio frequency signal based on the transmission data rate reported by the controller 12A, and outputs the resultant signal as a transmission radio frequency signal. The transmission radio frequency signal output from the transmission circuit 5 is supplied to the antenna 1 via the antenna duplexer 2, and burst-transmitted from the antenna 1 to a base station (not shown).

An input unit 14 is provided with a key group that includes dial keys, a call origination key, power key, end key, volume key and mode designation key, etc. The display 15 is provided with an LCD display and LED. The LCD display displays information memorized in a telephone book, the history of outgoing and/or incoming call, the phone number of a caller or person called, mail addresses, the operation state of the terminal, etc. Further, the LED is lightened or flickered to inform a user of a coming call, or to require the charge of a battery 16.

Reference numeral 17 denotes a power supply circuit, which generates a predetected operation power voltage Vcc based on the output of the battery 16, and supplies it to each circuit unit. Further, the power supply circuit 17 contains a charging circuit for charging the battery 16.

The mobile communication terminal of this embodiment comprises the aforementioned memory 13 for memorizing, for example, contents, and a user clock 21 and system clock 22. Both the user clock 21 and system clock 22 execute time measurement using an RTC (Real Time Clock). However, the user clock 21 can be manually operated by a user to execute optional time setting, while the system clock 22 cannot be operated by a user. The system clock 22 executes time measurement in synchronism with system time data transmitted from a base station BS, in an idle state or during communication.

The controller 12A is formed of, for example, a microcomputer as a main controller, and has standard control functions for mobile terminals, such as a communication control function for executing radio connection control in response to an outgoing or incoming call to enable speech or data communication, a position registration control function, an idle hand-off control function, etc. The controller also has new control functions according to the embodiment, such as a contents reproduction control function 12a and expiration time detecting function 12b.

The expiration time detecting function 12b detects, when contents are reproduced, whether or not a reproduction expiration time is set for the contents. If the reproduction expiration time is set, the time measured by the system clock 22 is compared with the reproduction expiration time to detect whether the measured time is not after the reproduction expiration time.

The contents reproduction control function 12a reads the contents from the memory 13 and executes control for their reproduction, if the expiration time detecting function 12b detects that the time measured by the system clock 22 is on or before the expiration time. On the other hand, if it is detected that the measured time is after the expiration time, reproduction of the contents is inhibited, and a message "Expired" is generated and displayed on the display 15.

The contents reproduction control function 12a and expiration time detecting function 12b are each realized by making the microprocessor of the controller 12A execute a corresponding program. These programs are memorized in a program memory in the controller 12A or the program memory area of the memory 13. The programs memorized in the program memory or memory area may be prememorized therein by a program writer during manufacture of the terminal, or may be read from an external memory such as a CD-ROM or memory card and written to the program memory or program memory area when the use of the terminal is started, or may be downloaded from a maker site via a communication network and written to the program memory or program memory area.

Figure 2:
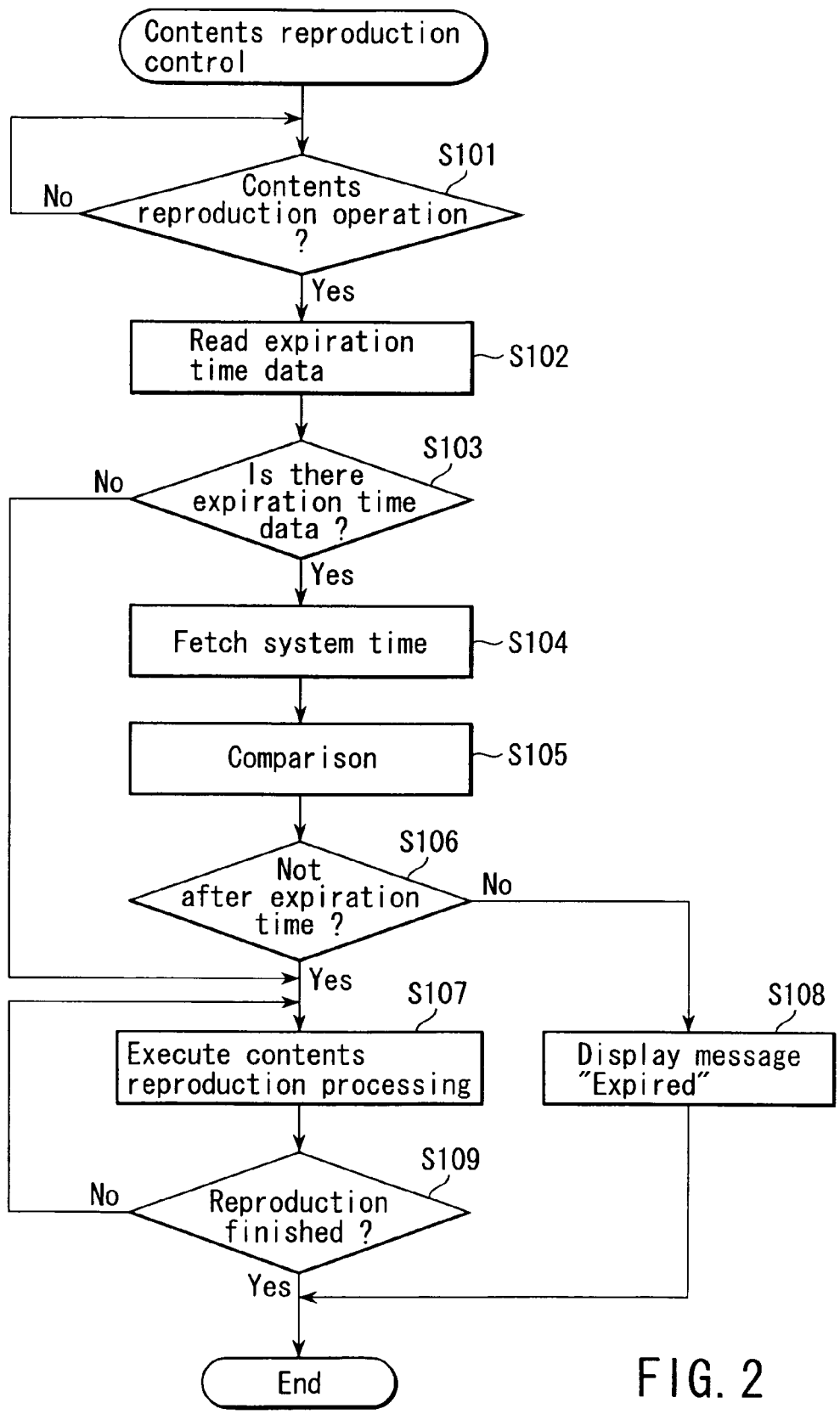
FIG. 2 is a flowchart useful in explaining the details and procedure of contents reproduction control executed by the information terminal device of the first embodiment.

A description will now be given of the contents reproduction operation of the mobile communication terminal constructed as above. FIG. 2 is a flowchart illustrating the procedure and details of contents reproduction control executed by the controller 12A.

The memory 13 prememorizes contents. The contents are downloaded from, for example, a web site on the Internet, or transferred from an external information device, such as a personal computer, via a cable or radio interface such as Bluetooth, or read from a memory card. The contents are thus fetched and memorized in the memory 13.

The time measured by the system clock 22 becomes unstable if the battery 16 is removed. This unstable state is not eliminated simply by attaching the battery 16 again, and continues until the controller 12A receives system time data from the base station BS and sets, as the present time of the system clock 22, the time measured based on the received system time data. Upon the initial setting of the measured time, the system clock 22 starts free-running time measurement based on RTC (Real Time Clock).

After the system clock 22 starts free-running time measurement, the controller 12A periodically receives the system time data, that is transmitted from the base station BS, during the idle state and communication state, and adjusts the time measured by the system clock 22 based on the received system time data. Accordingly, the measured time of the system clock 22 is always synchronous with the system time of the base station, and cannot be intentionally changed by a user.

The receiving of the system time data is executed by once switching the receiving channel from the paging channel to the sync-channel, then receiving a sync-channel signal transmitted from the base station, and extracting system time data from the received synch-channel signal.

During the idle state, the controller 12A monitors, at a step S101, an operation for reproducing contents executed by a user. In this state, assume that the user has designated the contents memorized in the memory 13 and has executed the reproduction operation of the contents, using the input unit 14. At this time, firstly, the controller 12A activates the expiration time detecting function 12b to read, from the memory 13 at a step S102, time information corresponding to the designated contents, and to detect, at the next step S103, whether or not expiration time data is set. If no expiration time data is set, reproduction of the contents is executed unconditionally at a step S107.

On the other hand, assume that expiration time data is set for the designated contents. In this case, the controller 12A proceeds to a step S104, where it reads the time measured by the system clock 22. At the next step S105, the controller 12A compares the measured time with the expiration time data read from the memory 13, and detects at a step S106 whether or not the reproduction expiration time of the designated contents is exceeded.

If the detection result indicates that the reproduction expiration time of the designated contents is not exceeded, the controller 12A activates the contents reproduction control function 12a to execute reproduction processing on the designated contents at a step S107. In the reproduction process, for example, the contents are read from the memory 13, and it is detected whether they are audio contents such as music, or photo contents such as a still image used as a wallpaper. If they are audio contents, audio data is decoded and output from the loudspeaker 10 via the PCM encoder 8 and receiving signal amplifier 9. On the other hand, if they are photo contents, still image data is decoded and displayed on the display 15.

Further, if the contents are video contents formed of audio data and video data, audio data is decoded and output from the loudspeaker 10 via the PCM encoder 8 and receiving signal amplifier 9, while video data is decoded and displayed on the display 15. The audio data output operation is executed in synchronism with the video data display operation based on a time stamp attached to the data.

If a loudspeaker dedicated to reproduction of audio contents is provided in addition to the receiving loudspeaker 10, audio data is controlled to be output from the loudspeaker dedicated thereto. Further, if output terminals for audio and video data are provided, audio and video data are supplied to, for example, an external personal computer via the output terminals, where they are output and displayed.

When reproduction of contents has started, the controller 12A monitors at a step S109 whether reproduction has finished, and returns to the idle state after reproduction finishes.

On the other hand, assume that it is detected at the step S106 that the reproduction expiration time of the designated contents is exceeded. In this case, the controller 12A does not execute a reproduction inhibition process on the contents, and proceeds to a step S108, where a message "Expired" is generated and displayed on the display 15.

As described above, in the first embodiment, detection as to the reproduction expiration time of contents is performed, using the measured time of the system clock 22 managed by the system time of the base station BS, and the contents can be reproduced if their reproduction expiration time is not exceeded. Thus, the detection as to the reproduction expiration time of contents can be accurately executed without the influence of a clock error, compared to the conventional case where such detection is executed using the time measured by the user clock 21. Moreover, regardless of a user's intentional change of the time of the user clock, unauthorized use of contents can be reliably prevented.

If the reproduction expiration time of contents designated as a to-be-reproduced object is exceeded, reproduction of the contents is not executed, and a message "Expired" is generated and displayed on the display 15. From this message, the user can recognize the expiration of the contents.

Second Embodiment

In a second embodiment, a GPS (Global Positioning System) receiver is used as means for externally acquiring a standard time, and system time data is received from the GPS receiver when contents are reproduced. By comparing the received system time data with the reproduction expiration time of the contents, it is detected whether or not the reproduction expiration time of the contents is exceeded. If it is detected that the reproduction expiration time of the contents is not exceeded, the reproduction of the contents is permitted.

Figure 3:
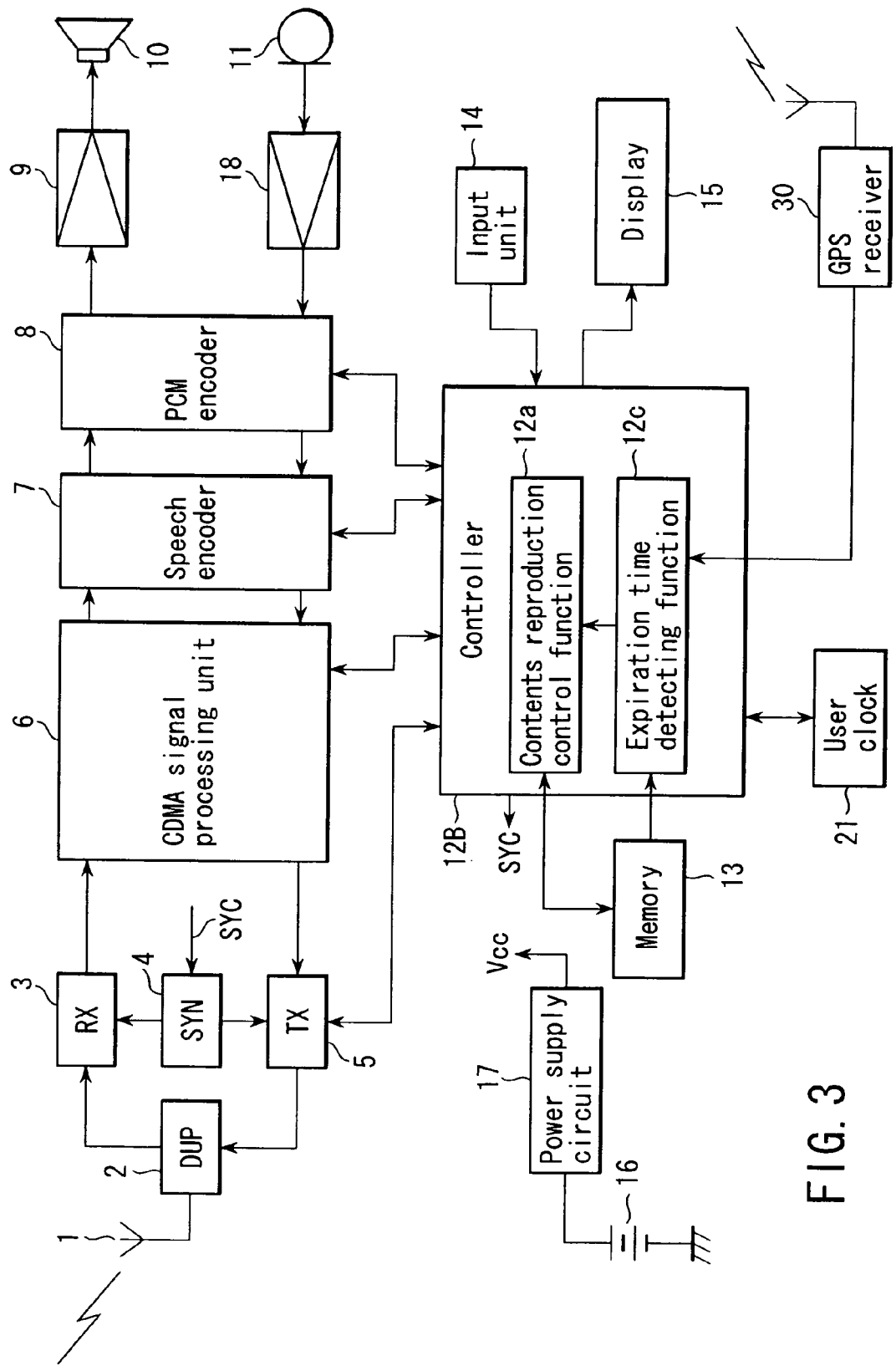
FIG. 3 is a block diagram illustrating the configuration of a mobile communication terminal as an information terminal device according to a second embodiment of the invention.

FIG. 3 shows the configuration of a mobile communication terminal according to the second embodiment. In FIG. 3, elements similar to those shown in FIG. 1 are denoted by corresponding reference numerals and are not described in detail.

The mobile communication terminal of the second embodiment employs a GPS receiver 30. The GPS receiver 30 receives GPS signals transmitted from a plurality of navigational satellites (not shown), extracts system time data from the GPS signals, and supplies it to a controller 12B.

The controller 12B has a contents reproduction control function 12a and expiration time detecting function 12c, as functions according to the embodiment.

The expiration time detecting function 12c fetches system time data from the GPS receiver 30, if a request for reproduction of contents, for which a reproduction expiration time is set, is input. By comparing the fetched system time data with the reproduction expiration time of the contents, the expiration time detecting function 12c detects whether or not the reproduction expiration time of the contents is exceeded.

The contents reproduction control function 12a permits contents to be reproduced, if the expiration date detecting function 12c detects that the reproduction expiration time of the contents is not exceeded. On the other hand, if the function 12c detects that the reproduction expiration time of the contents is exceeded, the function 12a inhibits reproduction of the contents, and displays a message "Expired" on the display 15.

In the above-described structure, detection as to the reproduction expiration time of contents is executed based on system time data each time the GPS receiver 30 receives the system time data. Accordingly, compared to the conventional case where detection is executed using the time measured by the user clock 21, accurate detection as to the reproduction expiration time of contents can be performed without being influenced by a clock error. Moreover, regardless of a user's intentional change of the time of the user clock, unauthorized use of contents can be reliably prevented.

Further, if the reproduction expiration time of contents designated as a to-be-reproduced object is exceeded, reproduction of the contents is not executed, and a message "Expired" is generated and displayed on the display 15. From this message, the user can recognize the expiration of the contents.

The use of the GPS receiver 30 as standard time acquisition means enables the embodiment to be applied in a system, other than the CDMA mobile communication system, such as the TDMA (Time Division Multiple Access) mobile communication system or an analog mobile communication system, in which a base station does not transmit system time data.

Third Embodiment

In the first embodiment, the system clock 22 having its measured time adjusted by received system time data is provided as well as the user clock 21, and detection as to the reproduction expiration of contents is performed based on the time measured by the system clock 22.

However, the invention is not limited to this. It may be modified such that when a request for reproduction of contents has been input, the time measured by the user clock is adjusted based on the received system time data, and detection as to the reproduction expiration time of the contents is performed based on the adjusted time.

Figure 4:
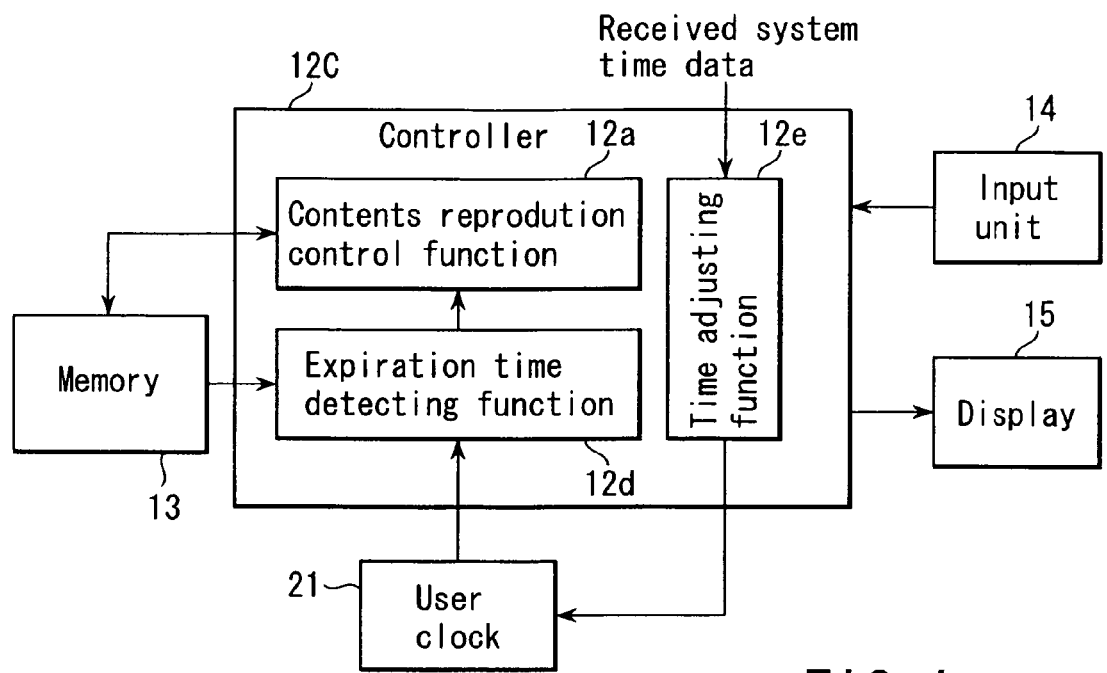
FIG. 4 is a block diagram illustrating the configuration of a mobile communication terminal as an information terminal device according to a third embodiment of the invention.

FIG. 4 is a block diagram illustrating the configuration of a mobile communication terminal as an information terminal device according to the third embodiment of the invention. In FIG. 4, elements similar to those shown in FIG. 1 are denoted by corresponding reference numerals. A controller 12C also has an expiration time detecting function 12d and time adjustment function 12e.

The time adjustment function 12e is used to receive updated system time data from a base station BS and properly adjust the time measured by the user clock 21 based on the received system time data, when a request for reproduction of contents, for which a reproduction expiration time is set, has been input from the input unit 14.

The expiration time detecting function 12d fetches the properly adjusted time from the time adjustment function 12e, and compares the fetched time with the reproduction expiration time of the contents to detect whether or not the reproduction expiration time is exceeded.

The contents reproduction control function 12a enables reproduction of contents if the expiration time detecting function 12d detects that the reproduction expiration time of the contents is not exceeded. On the other hand, if the expiration time detecting function 12d detects that the reproduction expiration time of the contents is exceeded, the contents is not reproduced, and a message "Expired" is generated and displayed on the display 15.

In the above-described configuration, since detection as to the reproduction expiration time is performed based on the measured time of the user clock 21 adjusted based on the system time data, accurate detection can be always executed. Furthermore, since the time measured by the user clock 21 is utilized, the system clock 22 is not necessary, and accordingly the configuration can be simplified. This embodiment is suitable for terminals, other than the CDMA mobile communication terminal, in which the system clock is not standard equipment.

Fourth Embodiment

In the configuration of FIG. 4, the measured time of the user clock 21 is automatically adjusted to the system time whenever contents are reproduced. Therefore, if a user changes the time of the user clock 21 to any optionally selected time, for example, if the user advance the time of the user clock by a predetected time, the user must reset the time of the user clock 21 each time the time of the user clock is automatically adjusted to the system time.

To avoid this inconvenience, a time correction function is employed. If a request for reproduction of contents is input, the time output from the user clock 21 is corrected based on received system time data, and detection as to the reproduction expiration time of contents is performed based on the corrected time.

Figure 5:
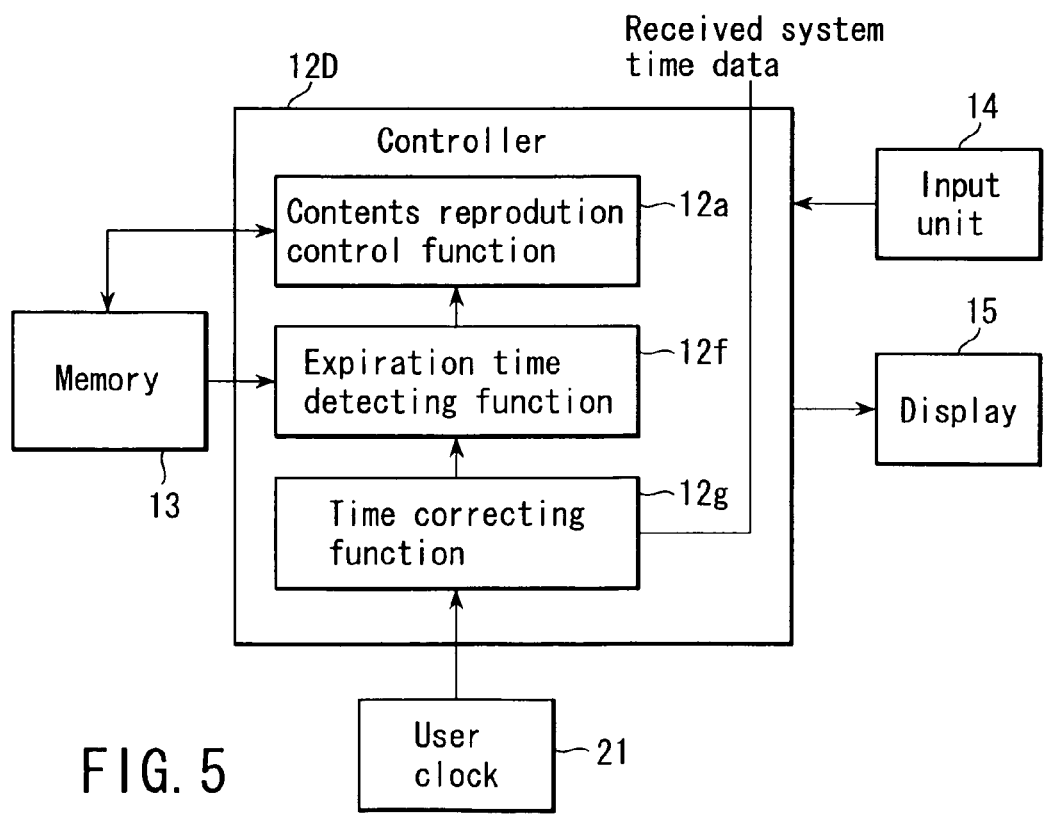
FIG. 5 is a block diagram illustrating the configuration of a mobile communication terminal as an information terminal device according to a fourth embodiment of the invention.

FIG. 5 is a block diagram illustrating the configuration of an essential part of a mobile communication terminal according to the fourth embodiment of the invention. In FIG. 5, elements similar to those shown in FIG. 1 are denoted by corresponding reference numerals. The mobile communication terminal of this embodiment incorporates a controller 12D that has a contents reproduction control function 12a, expiration time detecting function 12f and time correction function 12g.

The time correction function 12g corrects the time output from the user clock 21, based on received system time data.

The expiration time detecting function 12f fetches the time corrected by the time correction function 12g, when a request for reproduction of contents has been input. By comparing the fetched time with the reproduction expiration time of the contents, the function 12f detects whether or not the reproduction expiration time is exceeded.

The contents reproduction control function 12a permits contents to be reproduced, if the expiration date detecting function 12f detects that the reproduction expiration time of the contents is not exceeded. On the other hand, if the function 12f detects that the reproduction expiration time of the contents is exceeded, the function 12a inhibits reproduction of the contents, and displays a message "Expired" on the display 15.

In the above-described configuration, for detection as to the expiration time of contents, the time obtained by correcting the time output from the user clock 21 based on system time data is used. Thus, the detection as to the reproduction expiration time can be always executed using the accurate time corrected based on the system time data, with the result that accurate detection is realized and the system clock 22 can be omitted.

Moreover, since the measured time of the user clock 21 itself is not adjusted, even if a user changes the time of the user clock 21 to any optionally selected time, for example, if the user advance the time of the user clock by a predetected time, the user do not have to reset the time of the user clock 21. Thus, the operability is enhanced.

Further, the invention can be modified in various ways.

For example, although the second embodiment employs the GPS receiver 30 as means for acquiring a standard time, a standard time receiver may be employed instead of the GPS receiver so that a standard time transmitted from a standard time broadcast station will be received and used.

In each of the above-described embodiments, if the reproduction expiration time is exceeded, a message "Expired" is generated and displayed. However, a message "Not Expired" may be generated and displayed as well as "Expired". In this case, it is advisable to display the remaining date and/or time as well as the message "Not Expired".

As means for reporting that contents cannot be reproduced, a voice message may be output from the loudspeaker 10, as well as a letter message displayed on the display 15.

Furthermore, in each embodiment, the contents, for which a reproduction expiration time is set, are described. However, the invention is also applicable to the contents for which a reproduction valid term is set. In this case, a reproduction expiration time is set from the reproduction valid term and a start time of use, the time of the user clock adjusted based on system time data, or the measured time of the system clock being used as the start time of use. In other words, a reproduction valid term is converted into a reproduction expiration time, and it is detected whether contents are reproducible, using the resultant reproduction expiration time.

In addition, in each embodiment, a CDMA mobile communication terminal is used as an information terminal device. However, a mobile communication terminal that employs another radio communication method, such as a TDMA mobile communication terminal, analog mobile communication terminal, etc., may be used instead. Further, the invention is not limited to mobile communication terminals, but is also applicable to portable electronic devices such as notebook type personal computers, audio players, video reproduction apparatuses, game machines, clocks, etc., or to stationary personal computers, audio players, etc.

As described above, detection as to the reproduction expiration time of contents can be always executed based on a standard time, using no internal clock. Thus, the invention can provide an information terminal device capable of accurate detection as to a reproduction expiration time irrespective of an error in the time measured by the internal clock, and hence capable of preventing unauthorized use of contents regardless of a user's intentional change of the time of the internal clock.

Even if there is an error in the time measured by a first clock that can be adjusted by a user, or even if a user intentionally changes the time of the first clock, the time of the first clock is used for detection as to a reproduction expiration time after it is adjusted based on a standard time received. Accordingly, accurate reproduction expiration time detection can be always performed by adding a simple device to the existing first clock.

Furthermore, if a user changes the time of the first clock to an arbitrary time, the time output from the first clock is used for detection as to the reproduction expiration time of contents after it is corrected based on standard time data. Accordingly, accurate reproduction expiration time detection can be always performed using the existing first clock. Also, since, the first clock itself is not adjusted, and the time output therefrom is corrected based on standard time data, it is not necessary for the user to reset the first clock to their desired time.

Further, detection as to the reproduction expiration time of contents can be performed using the time measured by a second clock operable independent of the first clock. Accordingly, the reproduction expiration time detection can be always accurately performed without depending upon the first clock.

A system time corresponding to a standard time can be acquired using the existing mobile communication function. In other words, it is not necessary to employ any new receiving means for acquiring standard time data. Thus, accurate reproduction expiration time detection can be realized by a simple structure.

System time data can be acquired anywhere if a signal from a navigational satellite can be received. Therefore, an information terminal device having an expiration time detecting function can be used in an extremely wide area, compared to the case of acquiring system time data from a mobile communication base station.

The mobile communication terminal of the invention further comprises message reporting means for is generating a message "Expired" and reporting the fact to a user, if it is detected that the measured time is after the reproduction expiration time of contents. This enables the user to know the reason why the contents are not reproduced.

Fifth Embodiment

In a fifth embodiment, when the contents, for which a reproduction expiration time is set, are reproduced, it is detected whether or not the time measured by the system clock is valid. If the time measured by the system clock is valid, detection as to the reproduction expiration time is executed based on the measured time, and the reproduction of the contents is allowed if the reproduction expiration time is not exceeded. On the other hand, if the time measured by the system clock is invalid, neither detection as to the reproduction expiration time nor reproduction of the contents is executed.

FIG. 6 is a block diagram illustrating a mobile communication terminal MS as an information terminal device according to the fifth embodiment. This mobile communication terminal MS employs the CDMA (Code Division Multiple Access) system as the radio communication method between the terminal and a base station BS. In FIG. 6, elements similar to those shown in FIG. 1 are denoted by corresponding reference numerals and are not described in detail.

The mobile communication terminal has new control functions according to the embodiment, such as an expiration time detecting function 12*h*, system time valid/invalid detecting function 12*i* and system time acquisition adjusting function 12*j*.

The system time acquisition adjusting function 12*j* periodically receives system time data transmitted from a base station upon turn-on, and during an idle state and communication state. Based on the received system time data, setting and adjustment of the system clock 22 is executed.

The system time valid/invalid detecting function 12*i* detects whether or not the time measured by the system clock 22 is valid, when a request for reproduction of contents has been input. If the measured time is detected invalid, a message indicative of it is displayed on the display 15. Detection as to the validity/invalidity of the measured time is performed in the following manner.

The time measured by the system clock 22 becomes unstable if the battery 16 is removed. This unstable state is not eliminated simply by attaching the battery 16 again, and continues until the system time acquisition adjusting function 12*j* receives system time data transmitted from a base station BS, and executes initial setting of the system clock 22 based on the received system time data. This unstable state is defined as an "invalid" state. Upon initial setting of the time, the system clock 22 starts free-running time measurement based on RTC (Real Time Clock), and the measured time of the system clock 22 is automatically adjusted based on the system time data received periodically. This time measurement state is defined as a "valid" state. Whether the state of the system clock 22 is "valid" or "invalid" is detected by referring to, for example, a flag that indicates the state of the system clock 22 and is memorized in a memory in a controller 12E.

The expiration time detecting function 12*h* is activated if the system time valid/invalid detecting function 12*i* detects that the measured time of the system clock 22 is valid. Firstly, the function 12*h* detects whether or not a reproduction expiration time is set for the contents. If the reproduction expiration time is set, the function 12*h* compares the time measured by the system clock 22 with the reproduction expiration time, thus detects whether the measured time is not after the reproduction expiration time.

The contents reproduction control function 12*a* reads the contents from the memory 13 and executes reproduction control for them, if the expiration time detecting function 12*h* detects that the measured time is not after the reproduction expiration time. On the other hand, if the expiration time detecting function 12*h* detects that the measured time is after the reproduction expiration time, the contents reproduction control function 12*a* does not execute reproduction control for the contents, and generates a message "Expired" and displays it on the display 15.

The contents reproduction control function 12*a*, expiration time detecting function 12*h*, system time valid/invalid detecting function 12*i* and system time acquisition adjusting function 12*j* are all realized by making the microprocessor of the controller 12E execute respective programs. These programs are memorized in the program memory of the controller 12E or the program memory area of the memory 13. The programs memorized in the program memory or memory area may be prememorized therein by a program writer during manufacture of the terminal, or may be read from an external memory such as a CD-ROM or memory card and written to the program memory or program memory area when the use of the terminal is started, or may be downloaded from a maker site via a communication network and written to the program memory or program memory area.

Figure 7:
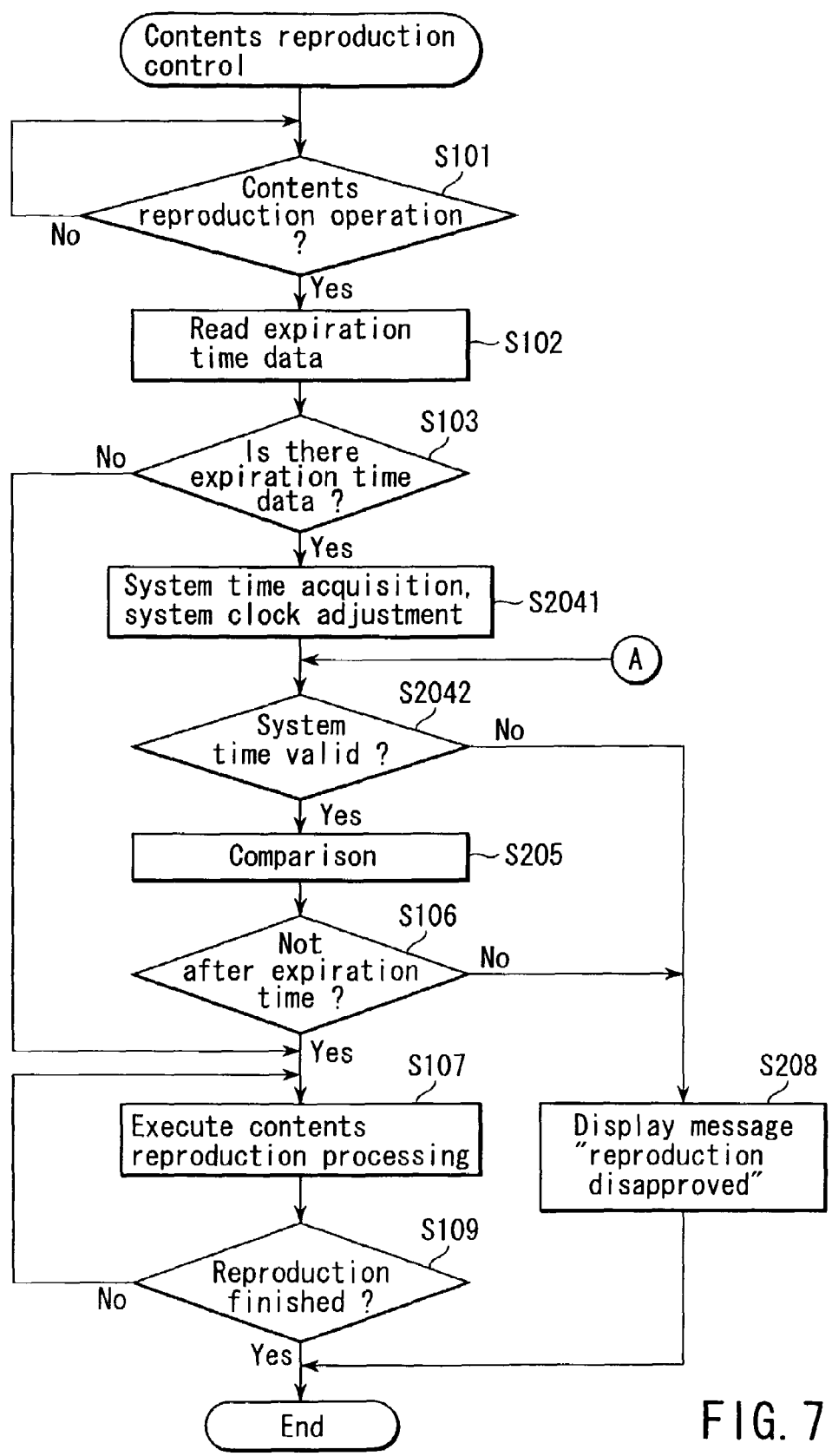
FIG. 7 is a flowchart useful in explaining the details and procedure of contents reproduction control executed by the information terminal device shown in FIG. 6.

A description will now be given of the contents reproduction operation of the mobile communication terminal constructed as above. FIG. 7 is a flowchart illustrating the procedure and details of contents reproduction control executed by the controller 12E. In FIG. 7, elements similar to those shown in FIG. 2 are denoted by corresponding reference numerals and are not described in detail.

Assume that expiration time information is set for the designated contents. In this case, the controller 12E proceeds to a step S2041 where it receives system time data from the base station BS, using the system time acquisition adjusting function 12j. Specifically, the system time data is received by once switching the receiving channel from the paging channel to the sync-channel, receiving a sync-channel signal transmitted from the base station, and extracting system time data from the received sync-channel signal. Subsequently, the controller 12E adjusts the time measured by the system clock 22 based on the received system time data. After that, the controller 12E proceeds a step S2042, where it detects, using the system time valid/invalid detecting function 12i, whether the measured time of the system clock 22 is valid or invalid.

Assume, for example, that no initial value is set in the system clock 22, and no system time data is received from the base station via the system time acquisition adjusting function 12j. In this case, the controller 12E detects that the time measured by the system clock 22 is "invalid", and proceeds to a step S208 where a reproduction disapproval message, which indicates that the contents cannot be reproduced, is generated and displayed on the display 15. This message includes the reason for the non-reproducible state and a message that recommends movement to a radio wave receivable place. From the displayed message, the user can recognize that detection as to the reproduction expiration time cannot be performed because no radio wave can be received.

On the other hand, assume that the system clock 22 is normally executing time measurement, and the system time valid/invalid detecting function 12i has detected "valid". In this case, the controller 12E proceeds to a step S205 where the expiration time detecting function 12h is activated to fetch the time, measured by the system clock 22, via the system time valid/invalid detecting function 12i. The expiration time detecting function 12h then compares the time measured by the system clock 22, with the reproduction expiration time previously read from the memory 13, thereby detecting at a step S106 whether or not the reproduction expiration time of the designated contents is exceeded.

Assume that the reproduction expiration time of the designated contents is exceeded as a result of the detection at the step S106. In this case, the controller 12E does not execute the reproduction of the contents, and proceeds to a step S208 where it generates a message "Expired" and displays it on the display 15. Thus, the user can recognize, from the display message, that the expiration time of the designated contents is exceeded.

As described above, in the fifth embodiment, before detection as to the reproduction expiration time of contents, it is detected whether or not the time measured by the system clock 22 is valid. If it is detected valid, detection as to the reproduction expiration time is executed based on the measured time of the system clock 22. If it is confirmed from the detection that the reproduction expiration time is not exceeded, the contents are read from the memory 13 and reproduced. On the other hand, if the measured time of the system clock 22 is invalid, or if the reproduction expiration time of the contents is exceeded, the contents are not reproduced, and a message indicative of the reason is generated and displayed on the display 15.

Thus, in this embodiment, the use of the measured time of the system clock 22 that is adjusted to the system time transmitted from the base station BS and cannot be adjusted by users enables detection as to the reproduction expiration time of contents to be executed accurately regardless of an error in measured time, and also enables unauthorized use of contents to be reliably prevented.

Further, if the measured time of the system clock 22 is invalid, detection as to the reproduction expiration time is not executed. Thus, reproduction expiration time detection is not executed if system time data cannot be received from the base station BS. This means that reproduction expiration time detection can be executed always based on accurate time, and hence highly reliable expiration time management can be realized.

Furthermore, if the measured time of the system clock 22 is invalid, or if the reproduction expiration time of contents designated as a to-be-reproduced object is exceeded, a message indicative of this is generated and displayed on the display 15. From the display message, users can clearly recognize the reason why the designated contents are not reproduced.

Sixth Embodiment

In a sixth embodiment of the invention, when a reproduction expiration time is set for the contents, for which a reproduction valid term, such as one month from the start of use, is set, it is detected whether or not the measured time of the system clock 22 is valid, and if it is detected valid, the reproduction expiration time is set for the contents based on the measured time of the system clock 22 and reproduction valid term. Further, also when the contents, for which the reproduction expiration time is set, are reproduced, it is detected whether or not the measured time of the system clock 22 is valid, and if it is detected valid, detection as to the reproduction expiration time is executed based on the measured time of the system clock 22. Only if it is confirmed, as a result of the detection, that the measured time is on or before the reproduction expiration time, the contents can be reproduced.

Figure 8:
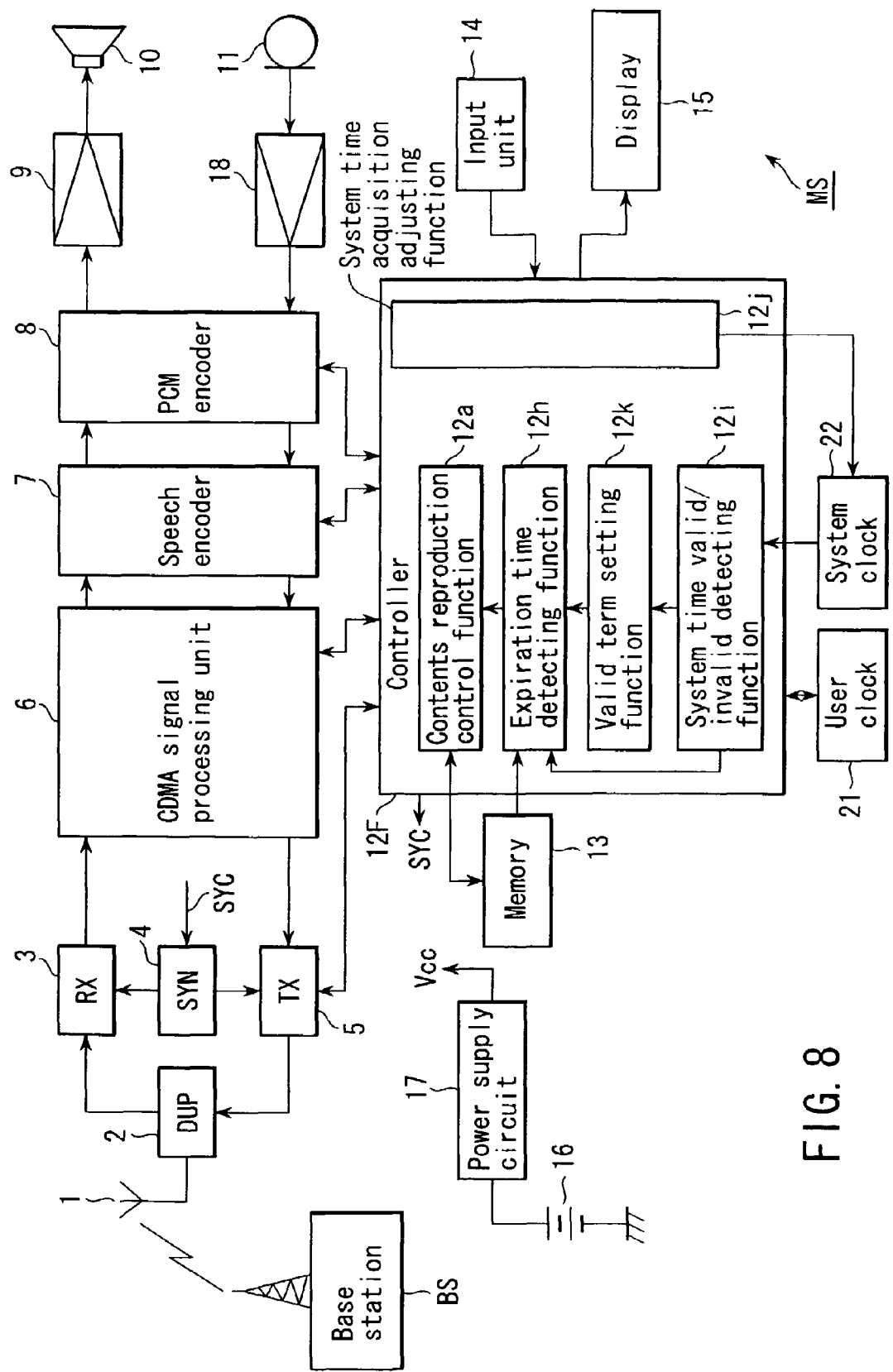
FIG. 8 is a block diagram illustrating the configuration of a mobile communication terminal as an information terminal device according to a sixth embodiment of the invention.

FIG. 8 is a block diagram illustrating a mobile communication terminal according to the sixth embodiment. In FIG. 8, elements similar to those shown in FIG. 6 are denoted by corresponding reference numerals and are not described in detail.

A controller 12F has, as control functions according to the sixth embodiment, a contents reproduction control function 12a, expiration time determining function 12h, system time valid/invalid determining function 12i, system time acquisition adjusting function 12j, and expiration time setting function 12k.

The expiration time setting function 12k sets a reproduction expiration time based on the measured time of the system clock 22 and a reproduction valid term, if the reproduction valid term is set as expiration time information for to-be-reproduced contents. Before the setting, the system time valid/invalid determining function 12i detects whether or not the measured time of the system clock 22 is valid. If it is detected valid, the expiration time setting function 12k executes a process for setting the reproduction expiration time. Further, if the measured time of the system clock 22 is invalid, the setting of the reproduction expiration time is not executed, and a message indicative of it is generated and displayed on the display 15.

Figure 9:
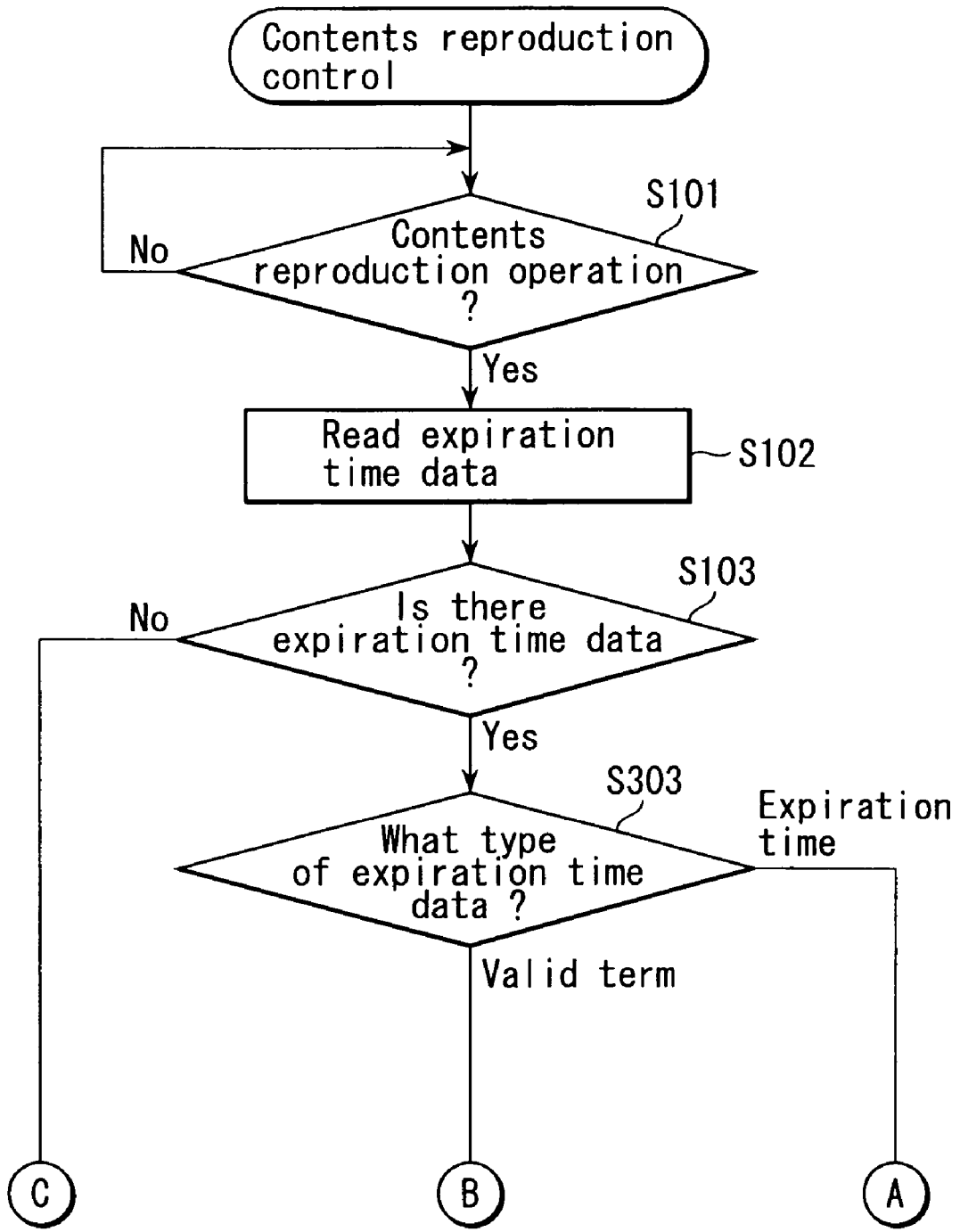
FIG. 9 is the first half of a flowchart useful in explaining the details and procedure of contents reproduction control executed by the information terminal device shown in FIG. 8.
Figure 10:
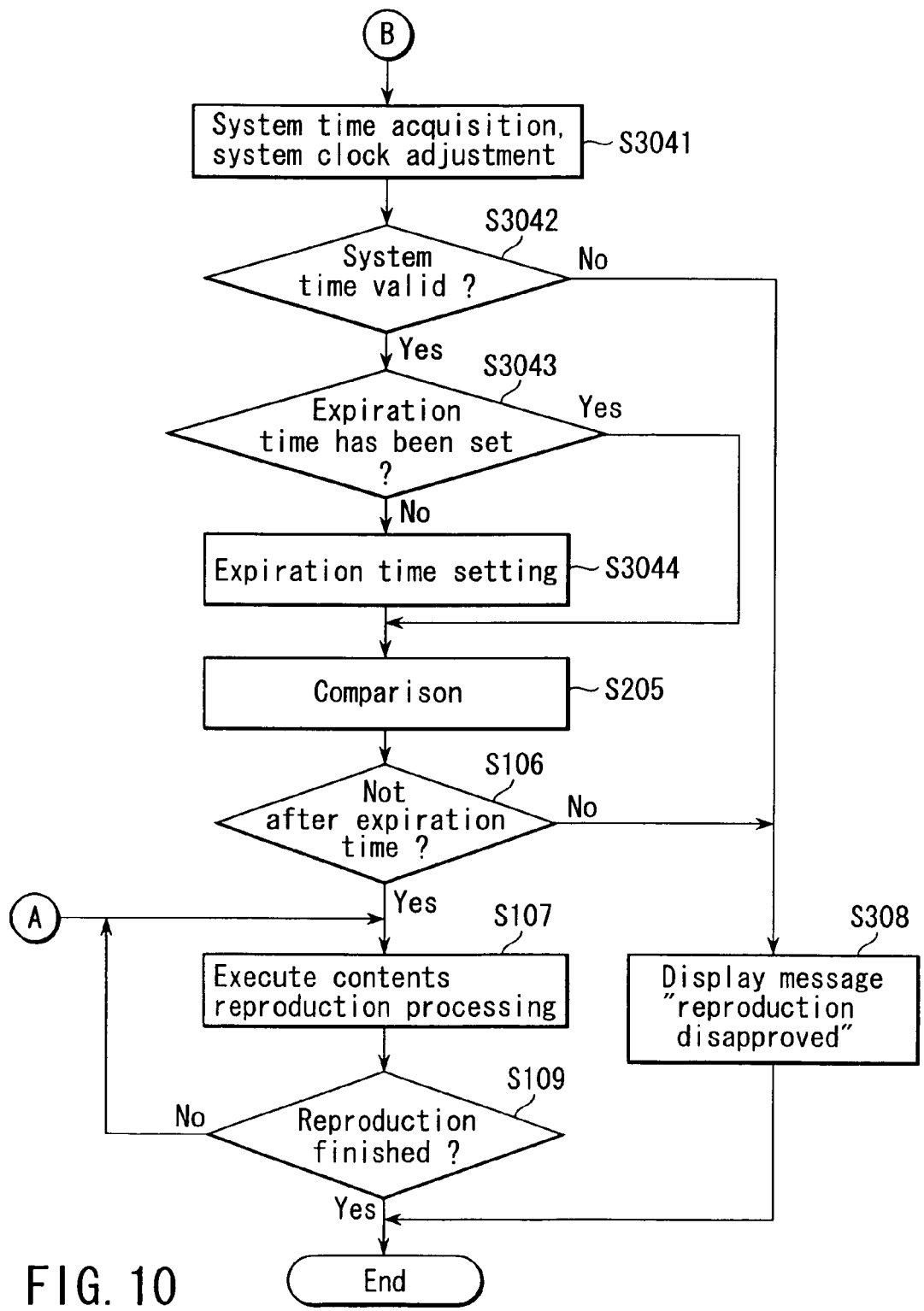
FIG. 10 is the last half of the flowchart useful in explaining the details and procedure of contents reproduction control executed by the information terminal device shown in FIG. 8.

The operation of reproducing contents by the mobile communication terminal constructed as above will be described. FIGS. 9 and 10 are the first and latter halves of a flowchart useful in explaining the details and procedure of contents reproduction control executed by the controller 12F, respectively. In FIGS. 9 and 10, steps similar to those shown in FIG. 2 or 7 are denoted by corresponding reference numerals and are not described in detail.

Assume that expiration time information is set for designated contents. In this case, the controller 12F proceeds to a step S303 where it detects whether the type of expiration time information is "expiration time" or "valid term".

If, for example, the type of expiration time information is "valid term", the controller 12F receives, at a step S3041, system time data from a base station BS, using the system time acquisition adjusting function 12j. Specifically, the system time data is received by once switching the receiving channel from the paging channel to the sync-channel, receiving a sync-channel signal transmitted from the base station, and extracting system time data from the received sync-channel signal. Subsequently, the controller 12F adjusts the measured time of the system clock 22 based on the received system time data. After that, the controller 12F proceeds a step S3042, where it detects, using the system time valid/invalid determining function 12i, whether the measured time of the system clock 22 is valid or invalid.

Assume, for example, that no initial value is set in the system clock 22, and no system time data is received from the base station via the system time acquisition adjusting function 12j. In this case, the controller 12F detects that the time measured by the system clock 22 is "invalid", and proceeds to a step S308 where a message, which indicates that a reproduction expiration time cannot be set for the contents, is generated and displayed on the display 15. This message includes the reason for the non-reproducible state and a message that recommends movement to a radio wave receivable place. From the display message, the user can recognize that the reproduction expiration time cannot be set because no radio wave can be received.

On the other hand, assume that the system clock 22 is normally executing time measurement, and the system time valid/invalid determining function 12i has detected "valid". In this case, the controller 12F proceeds to a step S3043 where a reproduction expiration time is set for the designated contents. If it is not set, a process for setting the reproduction expiration time is executed at a step S3044. The reproduction expiration time is set to a time obtained by adding the reproduction valid term to the measured time of the system clock 22.

After the expiration time is set, the controller 12F proceeds to the step S205 where the expiration time determining function 12h is activated to fetch the time measured by the system clock 22, using the system time valid/invalid determining function 12i. The expiration time determining function 12h then compares the measured time of the system clock 22 with the reproduction expiration time set at the step S3044, thereby determining at the step S106 whether or not the reproduction expiration time of the designated contents is exceeded.

On the other hand, assume that the detection result at the step S106 indicates that the reproduction expiration time of the designated contents is exceeded. In this case, the controller 12F does not execute the reproduction of the contents, and proceeds to a step S308 where it generates a message "Expired" and displays it on the display 15. Thus, the user can recognize, from the display message, that the expiration time of the designated contents is exceeded.

If the detection result at the step S303 indicates that the type of expiration time information is "expiration time", the controller 12F proceeds to the step S2042 shown in FIG. 7. Through the steps S2042-S109, it is detected whether or not the measured time of the system clock 22 is valid, and whether or not the reproduction expiration time of the contents is exceeded. If both the conditions are satisfied, the contents are reproduced.

As described above, in the sixth embodiment, before a reproduction expiration time is set for contents, it is detected whether or not the time measured by the system clock 22 is valid. If it is detected valid, the reproduction expiration time is set based on the measured time of the system clock 22 and reproduction valid term. Accordingly, the inconvenience can be avoided, in which a reproduction expiration time is set even if no system time data from the base station BS can be received and hence the measured time of the system clock 22 is unstable. As a result, an accurate reproduction expiration time can be set all the time.

Further, if the measured time of the system clock 22 is invalid, a message indicative of the reason is generated and displayed on the display 15. From the display message, users can clearly recognize the reason why a reproduction expiration time is not set for the designated contents.

Seventh Embodiment

In a seventh embodiment of the invention, if contents cannot be reproduced after their reproduction expiration time is set, because the measured time of the system clock is invalid, then the number of days the invalid state is continued is counted. The reproduction expiration time is automatically elongated by the number of days the contents could not be reproduced.

Figure 11:
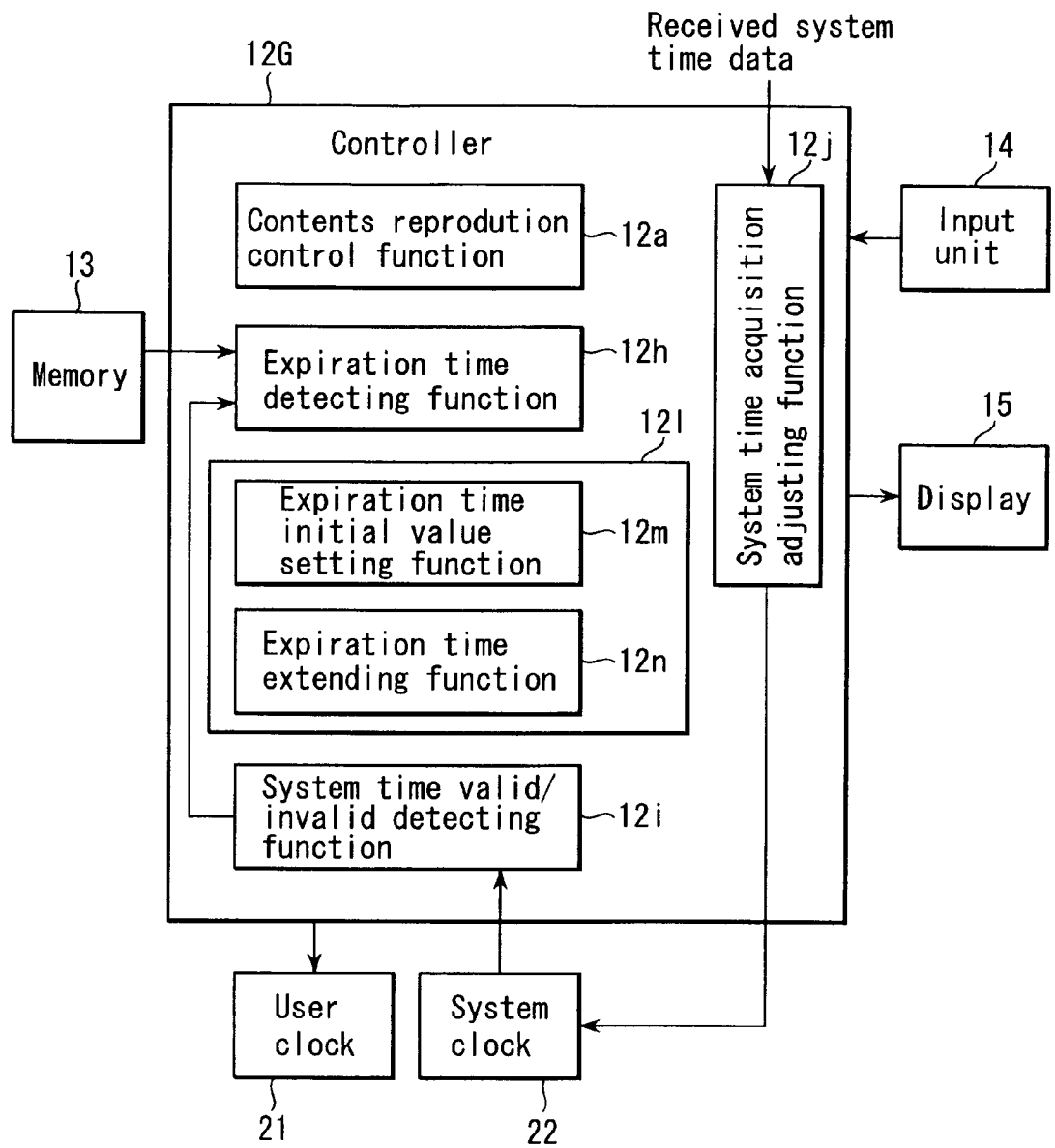
FIG. 11 is a block diagram illustrating an essential configuration of a mobile communication terminal as an information terminal device according to a seventh embodiment of the invention.

FIG. 11 is a block diagram illustrating a mobile communication terminal according to the seventh embodiment. In FIG. 11, elements similar to those shown in FIG. 8 are denoted by corresponding reference numerals and are not described in detail.

A controller 12G has, as control functions according to the seventh embodiment, a contents reproduction control function 12a, expiration time determining function 12h, system time valid/invalid determining function 12i, system time acquisition adjusting function 12j, and expiration time setting function 12l.

The expiration time setting function 12l includes an expiration time initial value setting function 12m and expiration time extending function 12n.

The expiration time initial value setting function 12m sets an initial reproduction expiration time based on the measured time of the system clock 22 and a valid term, if the valid term is set as expiration time information for to-be-reproduced contents. Before the setting of the initial expiration time, the system time valid/invalid determining function 12i detects whether or not the measured time of the system clock 22 is valid. If the measured time is detected valid, the initial reproduction expiration time is set. On the other hand, if the measured time of the system clock 22 is invalid, the initial value of the reproduction expiration time is not set, and a message indicating that no initial value is set is generated and displayed on the display 15.

After the expiration time initial value setting function 12m sets the initial value of the reproduction expiration time, if detection as to the reproduction expiration time is not executed and the system information cannot be reproduced, because the measured time of the system clock 22 is invalid, the expiration time extending function 12n measures, in units of, for example, days, the time period in which no reproduction could be executed. After that, the function 12n extends the initial reproduction expiration time by the counted days, and resets the expiration time to the extended value.

In the above-described structure, assume that a user has exchanged the battery 16 for another after setting the initial value of the reproduction expiration time. At this time, the measured time of the system clock 22 becomes unstable. This unstable state is eliminated, if the mobile communication terminal MS receives system time data transmitted from a base station BS after the power supply is turned on again, and if the present time of the system clock 22 is reset based on the received time data. However, if the mobile communication terminal MS is placed outside the service area of the base station BS, no system time data can be received from the base station BS, therefore the present time of the system clock 22 is not reset and is maintained unstable. In other words, in this state, the user cannot reproduce contents, and nevertheless, their reproduction valid term is reduced.

In the seventh embodiment, however, if the measured time of the system clock 22 is detected invalid after it is reset, the controller 12G counts the days invalidation detection occurred, extends the reproduction expiration time by the counted days, and resets the reproduction expiration time to the extended value. Thus, if the terminal cannot receive a radio wave from the base station BS, it automatically extends the reproduction expiration time of contents.

Therefore, the user can make full use of the reproduction valid term initially set for contents to reproduce the contents.

If the reproduction expiration time is automatically extended, it is advisable to display a message indicative of the fact. It is also advisable to display the extended expiration date or remaining days or time, as well as the message.

In each embodiment, system time data broadcasted from a CDMA base station is received as an external standard time. However, the invention is not limited to this, but may be modified such that the system time data may be received, using a GPS (Global Positioning System) receiver, when contents are reproduced. Further, a standard time receiver may be used instead of the GPS receiver, thereby receiving standard time information broadcasted from a standard time broadcasting station.

Further, the reproduction disapproval message may be a voice message created by a voice synthesizing function and output from the loudspeaker 10, as well as a message displayed on the display 15.

Furthermore, although in each embodiment, a CDMA mobile communication terminal is employed as an example of the information terminal device, a mobile communication terminal, such as a TDMA mobile communication terminal or analog mobile communication terminal, which uses another radio communication method, may be employed. Also, the invention is not limited to mobile communication terminals, but may be directed to portable electronic apparatuses, such as notebook type personal computers, audio players, video reproduction apparatuses, game machines, clocks, etc., or to stationary personal computers, audio players, etc.

In the information terminal devices of the above-described fifth to seventh embodiments, if the information terminal device is located at, for example, a place where it cannot receive a radio wave transmitted from a station for broadcasting a standard time, and hence if it cannot acquire the standard time, the time measured by the time measurement means is detected invalid, thereby preventing detection as to the reproduction expiration time of contents. As a result, accurate detection as to the reproduction expiration time of contents can be always executed.

Further, in the information terminal devices, when they set a reproduction expiration time for the contents for which a reproduction valid term is set, the reproduction expiration time is prevented from being set based on an erroneously measured time, and therefore can be accurately managed.

Also in the information terminal devices, unnecessary detection is not executed. Accordingly, the load on the controller and hence the power consumption of the devices can be reduced.

If the time measured by the time measurement means is detected invalid, it is advisable to generate and display a message indicative of it. In this case, users can clearly know the reason when the expiration time is not set.

When, for example, contents cannot be reproduced even if their reproduction expiration time is not exceeded, as in the case where a radio wave transmitted from a station for broadcasting a standard time cannot be received, the number of days reproduction was impossible is counted, and the expiration time is automatically extended by the counted days. Thus, users can use all the designated reproduction expiration time for reproduction of contents.

In addition, modification can also be made, without departing from the scope of the invention, to the procedures and details of control executed by the system time expiration valid/invalid determining function, expiration time setting function, expiration time determining function and contents reproduction control function, and to the type, form, structure, etc. of contents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A mobile communication terminal connectable to a base station over a wireless communication network that provides a synchronization channel and a paging channel, the synchronization channel transmitting a standard time, said mobile communication terminal comprising:

a memory configured to store a content having a reproduction expiration time;

an input unit having a plurality of keys and configured to receive a reproduction instruction;

an interface configured to communicate with the base station via the wireless communication network; and acquiring means for acquiring the standard time transmitted over the synchronization channel when the reproduction instruction is inputted by manipulating the input unit, wherein the improvement comprises:

comparing means for comparing the reproduction expiration time with the acquired standard time; and reproduction means for reproducing the content when the comparing means detects that the acquired standard time does not exceed the reproduction expiration time, such that reproduction of the content after the reproduction expiration time is prevented.

2. The mobile communication terminal according to claim 1, further comprising:

a system clock, which is adjusted based on the acquired standard time, wherein the comparing means compares the reproduction expiration time with information from the system clock.

3. The mobile communication terminal according to claim 1, wherein the content stored in the memory is obtained from a web site via the base station.

4. The mobile communication terminal according to claim 1, further comprising:

a second interface configured to be directly connected to a computer device, wherein the content is obtained from the computer device via the second interface.

5. A mobile communication terminal connectable to a base station over a wireless communication network that provides a synchronization channel and a paging channel, the synchronization channel transmitting a standard time, said mobile communication terminal comprising:

a memory configured to store a content having a reproduction expiration time;

an input unit having a plurality of keys and configured to receive a reproduction instruction;

an interface configured to communicate with the base station via the wireless communication network; and an acquisition unit configured to acquire the standard time transmitted over the synchronization channel when the reproduction instruction is inputted by manipulating the input unit, wherein the improvement comprises:

a comparison unit configured to compare the reproduction expiration time with the acquired standard time; and a reproduction unit configured to reproduce the content when the comparison unit detects that the acquired standard time does not exceed the reproduction expiration time, such that reproduction of the content after the reproduction expiration time is prevented.

6. The mobile communication terminal according to claim 5, further comprising:

a system clock, which is adjusted based on the acquired standard time, wherein the comparison unit compares the reproduction expiration time with information from the system clock.

7. The mobile communication terminal according to claim 5, wherein the content stored in the memory is obtained from a web site via the base station.

8. The mobile communication terminal according to claim 5, further comprising:

a second interface configured to be directly connected to a computer device, wherein the content is obtained from the computer device via the second interface.

9. A mobile communication terminal comprising:

a memory configured to store a content having a reproduction expiration time;

an input unit having a plurality of keys and configured to receive a reproduction instruction;

an interface configured to communicate with a base station via a wireless communication network, the interface configured to receive at least one of a synchronization channel and a paging channel from the base station, the synchronization channel including a standard time;

an acquiring unit configured to acquire the standard time via that synchronization channel when the reproduction instruction is inputted by manipulating the input unit, said acquiring unit configured to switch from the paging channel to the synchronization channel to acquire the standard time;

a comparing unit configured to compare the reproduction expiration time with the acquired standard time; and a reproduction unit configured to reproduce the content when the comparing unit detects that the acquired standard time does not exceed the reproduction expiration time, such that reproduction of the content after the reproduction expiration time is prevented.

10. The mobile communication terminal according to claim 9, further comprising:

a system clock, which is adjusted based on the acquired standard time, wherein the comparing means compares the reproduction expiration time with information from the system clock.

11. The mobile communication terminal according to claim 9, wherein the content stored in the memory is obtained from a web site via the base station.

12. The mobile communication terminal according to claim 9, further comprising:

a second interface configured to be directly connected to a computer device, wherein the content is obtained from the computer device via the second interface.

* * * * *